(12) United States Patent
Shamburger

(10) Patent No.: US 7,844,292 B2
(45) Date of Patent: Nov. 30, 2010

(54) SYSTEM AND METHOD FOR IN-BAND CONTROL SIGNALING USING BANDWIDTH DISTRIBUTED ENCODING

(75) Inventor: Kenneth H. Shamburger, Greenville, TX (US)

(73) Assignee: L-3 Communications Integrated Systems L.P.

(*) Notice: Subject to any disclaimer, the term of this patent is extended or adjusted under 35 U.S.C. 154(b) by 887 days.

(21) Appl. No.: 11/789,912

(22) Filed: Apr. 26, 2007

(65) Prior Publication Data

US 2008/0267390 A1    Oct. 30, 2008

(51) Int. Cl.
*H04Q 7/20*    (2006.01)

(52) U.S. Cl. .................. 455/518; 455/519; 455/500; 455/517; 455/426.1; 455/403; 370/270; 370/328; 370/329; 370/343; 375/130; 375/146; 375/147; 375/242; 375/244

(58) Field of Classification Search ............... 455/518, 455/519, 500, 517, 501, 422.1, 403, 550.1, 455/426.1, 426.2, 445, 414.1–414.4; 370/270, 370/328, 329, 343, 338; 375/130, 146, 147, 375/242, 244

See application file for complete search history.

(56) References Cited

U.S. PATENT DOCUMENTS

| | | | | |
|---|---|---|---|---|
| 5,235,598 | A | 8/1993 | Sasuta | 370/110.1 |
| 5,533,098 | A | 7/1996 | Lee | 379/58 |
| 5,625,872 | A | 4/1997 | Sawyer | 455/33.1 |
| 6,236,715 | B1 | 5/2001 | Wong | 379/88.03 |
| 2005/0068906 | A1* | 3/2005 | Muri | 370/260 |
| 2006/0171368 | A1 | 8/2006 | Moinzadeh et al. | 370/346 |
| 2006/0215639 | A1 | 9/2006 | Inagi | 370/352 |
| 2007/0244695 | A1* | 10/2007 | Manjunath et al. | 704/201 |

OTHER PUBLICATIONS

Cisco Systems Inc., Data Sheet, *"Cisco Land Mobile Radio Gateway,"* 1992-1995.
Cisco Systems Inc., *"Land Mobile Radio over IP Enhancement,"* 2005.
Cisco Systems Inc., Cisco IOS Software Release 12.4(2)T1, *"Cisco Land Mobile Radio over IP Solution Reference Network Design,"* Mar. 2006.

* cited by examiner

*Primary Examiner*—Keith T Ferguson
(74) *Attorney, Agent, or Firm*—O'Keefe, Egan, Peterman & Enders, LLP

(57) ABSTRACT

Systems and methods are disclosed for in-band control signaling using bandwidth distributed encoding to send modulated control carrier signals with analog voice signals in the same voice frequency band. A transmitting device generates control carrier signals spread over a voice frequency band, combines them with analog voice signals in the voice frequency band, and transmits the combined signals over a communication channel. The transmitting device can use a control signal encoder to apply a pseudo-random code to the control carrier signal in order to spread it over a voice frequency band. As such, control signals are sent as in-band signals without significantly degrading the voice signals. A receiving device receives the combined signals within the voice frequency band. The receiving device demodulates the combined signal and uses matching pseudo-random codes to determine if a control signal has been sent. The receiving device also reproduces the voice signals themselves. If a code is matched, then an appropriate response to the control signal can be taken.

29 Claims, 5 Drawing Sheets

US 7,844,292 B2

SYSTEM AND METHOD FOR IN-BAND CONTROL SIGNALING USING BANDWIDTH DISTRIBUTED ENCODING

TECHNICAL FIELD OF THE INVENTION

This invention relates to voice communications and, more particularly, to control signal associated with voice communications.

BACKGROUND

Certain voice communication systems currently exist, including push-to-talk (PTT) voice communication systems. With respect to PTT devices, current communication devices use out-of-band or voice sensing mechanisms to communicate control functions. Out-of-band approaches are used to prevent control signals from interfering with voice communication signals. The voice sensing approach senses the presence of a voice signal to generate the push-to-talk control signals. This voice sensing technique, however, often fails due to control signal timing issues, particularly when encryption units are included in the communication signal path.

Spread spectrum techniques have been used in communication systems. In spread spectrum systems, signal energy is first generated at a discrete frequency and then spread in time or frequency domains to establish secure communications, increase resistance to natural interference, and/or to prevent detection. With spread spectrum, a telecommunication signal is transmitted on a bandwidth considerably larger than the frequency content of the original information. Spread spectrum uses direct sequence, frequency hoping, or a combination of both techniques for multiple access and/or multiple functions to decrease potential interference to other receivers while maintaining privacy. These techniques can use pseudo-random number sequences as spreading codes. The pseudo-random sequences are sequences of numbers computed by a defined arithmetic process but are effectively random number sequences. Spread spectrum makes use of a sequential noise-like signal structure created by the use of spreading codes to spread the normally narrowband information signal over a relatively wideband band of frequencies. A receiver correlates the received signals to retrieve the original information signal.

SUMMARY OF THE INVENTION

Systems and methods are disclosed that use spread spectrum techniques to provide in-band control signaling for voice communication signals. This in-band bandwidth distributed encoding helps to provide the positive control of an out-of-band approach while using in-band signaling.

In one embodiment, voice communication systems are disclosed including transmitting devices and receiving devices. The transmitting device combines analog voice signals with modulated control carrier signals and then sends this combined voice and control signal through a communication channel. The receiving device receives the combined signal and processes it in two paths. A first voice processing path is used for recovering voice information from the combined signal, and a second control processing path is used to decode the combined signal to obtain the control signal information within the combined signal. The encoding can be implemented with spread spectrum techniques utilizing pseudo-random codes to spread control carrier signals over the voice communication frequency band, and the decoding can be implemented by de-spreading these modulated control carrier signals at the receiver. The communication channel can use analog and/or digital communication techniques, as desired. As described below, other features and variations can be implemented, if desired, and related methods can be utilized, as well.

In another embodiment, methods are disclosed for voice communications using in-band control signaling. The method can include receiving a control signal, generating a control carrier signal in a voice communication frequency band, modulating the control carrier signal using pseudo-random codes, combining the modulated control carrier signal with an analog voice signal, and transmitting the combined signal across a communication channel. The method can further include receiving the combined signal from the communication channel and processing the combined signal in a voice path and a control path. In the control processing path, the method can further include demodulating the combined carrier signal using a corresponding carrier signal, determining code match using a corresponding pseudo-random code, and outputting a control signal if a code match occurs. In the voice processing path, the method can further include recovering voice information from the combined signals and outputting the analog voice signals. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed that use spread spectrum techniques to provide in-band control signaling for voice communication systems. This in-band bandwidth distributed encoding helps to provide the positive control of out-of-band approaches while using in-band control signaling. The techniques described herein include transmitting devices capable of combining analog voice signals within a voice frequency band with modulated control carrier signals also located within this voice frequency band. The transmitting devices are further capable of transmitting the combined signals over a voice communication system. The techniques described herein also include receiving devices capable of receiving the combined signals from the communication system, demodulating and decoding the modulated control carrier signals within the combined signal to determine if a control signal has been sent, and recovering voice information from the voice signals within the combined signal. In this way, in-band control signaling is provided between the transmitting device and the receiving device without significantly degrading the voice information being transmitted and received.

Figure 1:
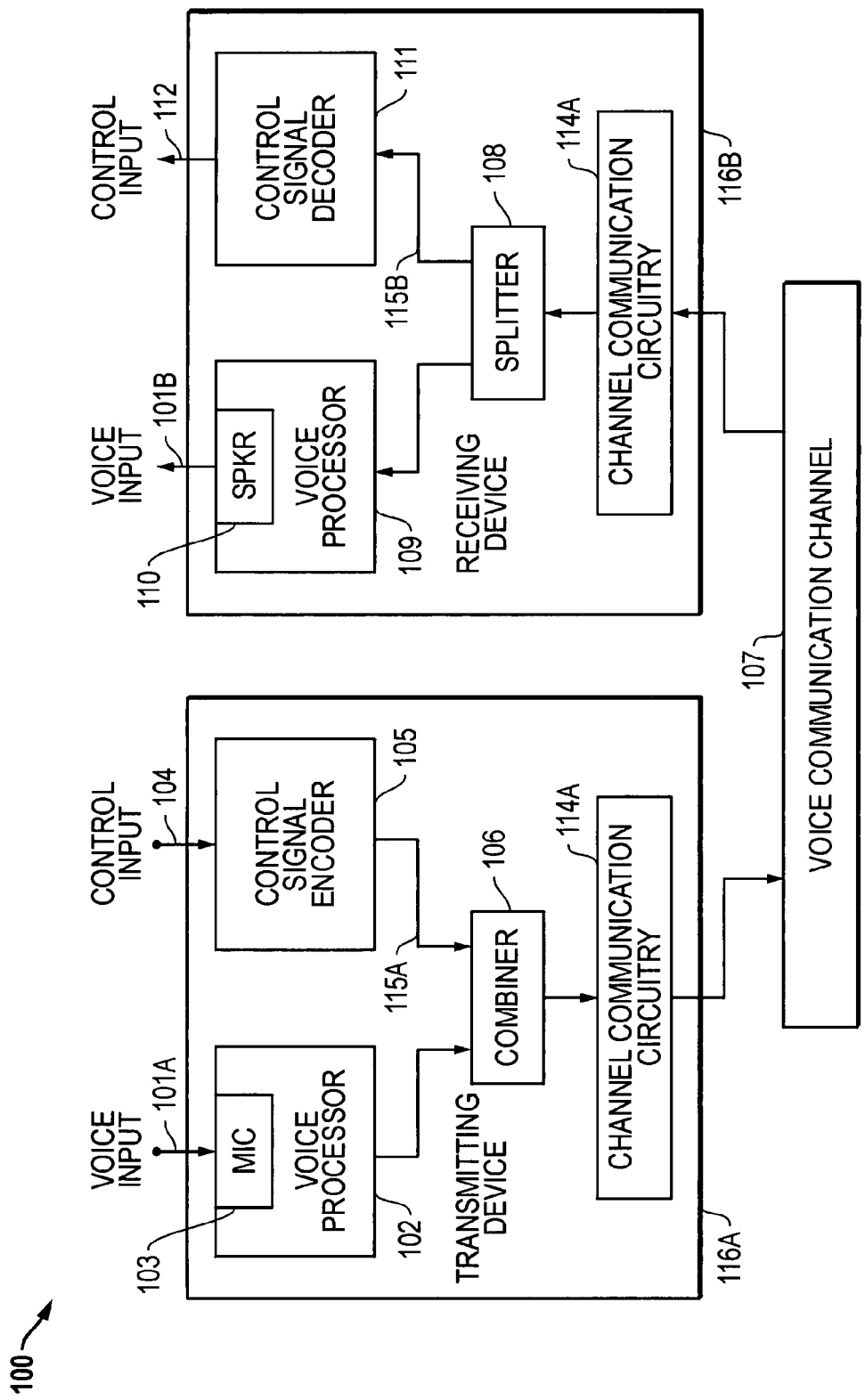
FIG. 1 is a block diagram of a system for in-band signaling using bandwidth distributed encoding.

FIG. 1 shows a system 100 for in-band control signaling using bandwidth distributed encoding. A transmitting device 116A communicates with a receiving device 116B through a voice communication channel 107 for voice communications. In the embodiment depicted, the transmitting device 116A includes a voice processor 102 having a microphone input (MIC) 103 for receiving analog voice input signals 101A from a user. The voice processor 102 can process this voice information, as desired, and then output analog voice signals within a voice frequency band. These analog voice signals represent the voice information within input signals 101A. As described in more detail below, a control signal encoder 105 receives control input 104 and outputs an in-band modulated signal 115A representing the state of the control input 104. The analog voice signals output from the voice processor 102 and the in-band modulated control carrier signal 115A from the control signal encoder 105 are provided to combiner 106, where the analog voice signals and the modulated control carrier signals are combined to form a combined signal within the voice frequency band used by the communication system. The combined signals are then sent from the combiner 106 to channel communication circuitry 114A. The channel communication circuitry 114A transmits the combined signals through the voice communication channel 107. It is noted that the control input signal 104, as shown, is provided from a source external to the transmitting device 116A; however, it could also be generated internally within the transmitting device 116A, as well.

A receiving device 116B receives the combined signal through the voice communication channel. This combine signal includes information representing the in-band modulated control carrier signal and the voice signals. The receiving device 116B includes channel communication circuitry 114B that communicates with the voice communication channel 107 to receive the combined signals and then sends the combined signals to splitter 108. The splitter 108 splits the combined signals into a voice processing path and a control processing path. The voice processing path travels from the splitter 108 to voice processor 109. The voice processor 109 processes the combined signals to extract voice information, and then sends output signals to speaker (SPKR) 110 where analog voice output signals 101B are produced. The control processing path travels from splitter 108 to the control signal decoder 111. The input signal 115B received by the control signal decoder 111 includes the in-band modulated control carrier signal. The control signal decoder 111 extracts the modulated signal from the combined signals even though the voice signals are also present. As described in more detail below, the control signal decoder 111 demodulates the control path signal, determines code match using pseudo-random codes, and outputs a control output signal 112 when a control code match is present to indicate the state of the control signal. It is noted that the control output signal 112, as shown, is provided as an external output from the receiving device 116B; however, the control output signal 112 could also be used internally within the receiving device 116B, as well. In addition, control output signal 112 could also be used solely within the receiving device 116B, if desired, without providing any external output signal.

The control input 104 and the control output 112 can correspond to any desired control signal. Typically, the control signal will be a control signal associated with the voice communications being transmitted by the transmitting device 116A and/or being received by the receiving device 116B. For example, the control input 104 can be a push-to-talk (PTT) control input related to two-way voice communications, and the control output 112 can be an indication that PTT has been selected by the other device. In addition, other control signals could be similarly converted to in-band modulated signals and combined with the analog voice signals for communication over the voice communication channel.

In one implementation, the in-band modulated signal and the voice signals can be configured to fall within a voice frequency band from about 300 Hz to about 3000 Hz. This frequency band is one common voice frequency pass band used as a voice channel for voice communications. It is noted that other frequency bands could be utilized, if desired, depending upon communication channels and frequency pass bands used for any particular voice communication system. It is also noted that the energy for intelligible speech is typically contained within a band of frequencies between about 200 Hz and about 4000 Hz. However, many telephone systems or other voice communication systems limit the upper and lower pass band frequencies for voice signals to the 300 Hz to 3000 Hz range indicated above.

Advantageously, the embodiments described herein utilize a voice frequency pass band both for analog voice signals and for in-band control signaling by spreading a control carrier signal across the voice frequency pass band using pseudo-random codes and spread spectrum techniques. As such, analog voice signals can be directly combined with in-band control signaling without significantly degrading the analog voice communications. And the same voice channel used for voice signals can be used to carry the in-band modulated control carrier signals, thereby providing an efficient mechanism for communicating control signals between transmitting and receiving devices.

The voice communication channel 107 can be any desired communication medium. In one embodiment, the voice communication channel could be implemented as one of a plurality of communication channels within a frequency band, where each channel has a different center frequency and a given channel width. Within these channels, multiple access techniques could also be utilized such as TDMA (time division multiple access) techniques. Alternatively, the communication channel could use spread spectrum techniques, such as frequency hopping or code modulation techniques, such as CDMA (code division multiple access) techniques. The voice communication channel could also include communications implemented as voice over IP (internet protocol) (VOIP) communications. In short, the voice communication channel 107 can be implemented as desired and can use multiple different systems and/or networked communication systems to provide for voice communications. The channel communication circuitry 114A and 114B are implemented to provide the appropriate interface with the voice communication channel 107, depending upon what communication techniques were used. Thus, the voice signals combined with in-band modulated control carrier signals, as described herein, can be processed and sent over any desired communication system.

Advantageously, the control carrier signal does not need to be removed from the voice signals before the voice signals are used, as in other approaches. Other approaches depend on subtracting the control signal from the voice signal before it is passed to the listener to avoid interfering with the voice signal. The lack of a need to remove the control signal, as described herein, is particularly advantageous. It is noted, however, that information from control signal decoder 111 could be provided to voice processor 109, if desired, to help reduce the amplitude of the control carrier signal before the combined signal is used to generate voice information. In short, a wide variety of techniques could be implemented while still taking advantage of control carrier signals that are spread across the voice frequency pass band and that are then combined with the voice signals in order to provide in-band control signaling as described herein.

Figure 2:
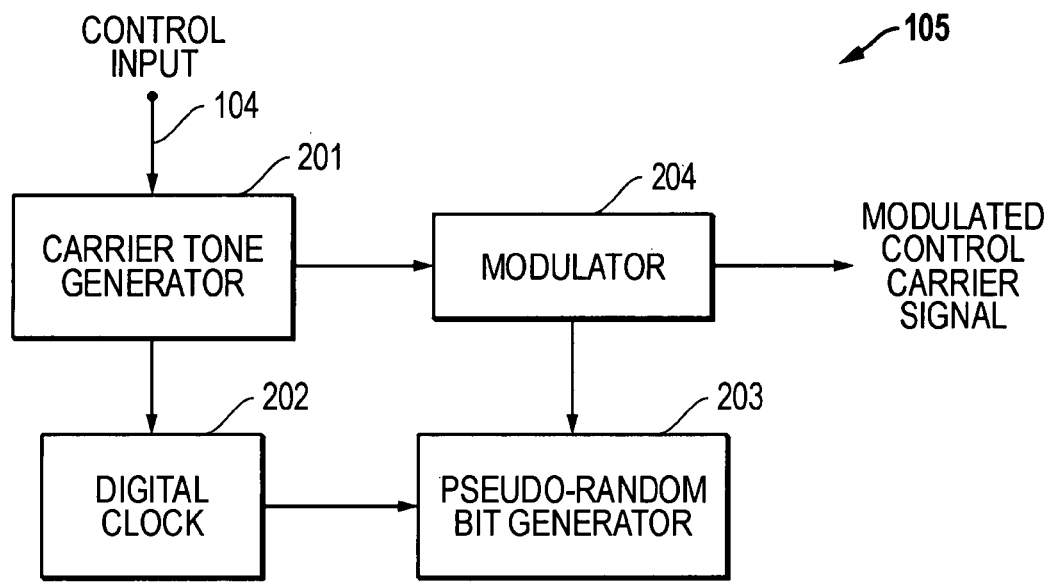
FIG. 2 is a block diagram of a control signal encoder within a transmitting device.

FIG. 2 shows example components of the control signal encoder 105 associated with the transmitting device 116A. A carrier tone generator 201 receives the control input 104 that represents the state of a control signal. The carrier tone generator outputs a signal at a selected carrier frequency to digital clock circuitry 202 and to modulator 204. The digital clock circuitry 202 outputs to pseudo-random bit generator 203 a digital clock signal that is dependent upon the frequency of the carrier signal from the carrier tone generator 201. The pseudo-random bit generator 203 generates a pseudo-random bit sequence, and this bit sequence is output to modulator 204 using the digital clock signal. The pseudo-random bit sequence is used to modulate the carrier signal from the carrier tone generator 201. The modulated control carrier signal 115A is then output and combined with the analog voice signal. The combined signals are transmitted over a voice communication channel 107 to the receiving device. It is noted that the frequency of the tone created by the transmitting carrier tone generator 201 is selected so that a majority of energy of the modulated signal will be contained in the voice frequency pass band, such as, for example, from about 300 Hz to about 3000 Hz. The random nature of the bit sequence spreads the carrier signal over the bandwidth of the voice communication band.

In operation, therefore, the transmitting device 116A combines analog voice signals within a frequency band with in-band modulated control carrier signals to send voice-plus-control signals over the voice communication channel 107. In this way, control signals are combined with analog voice signals and then sent over a single voice communication channel. This technique can use orthogonal, pseudo-random codes to modulate one or more tones or carriers. The code represents the control signal and causes the energy of the control carrier signal to be spread across the frequency pass band utilized for the voice communication channel. Spreading the control signal across the voice frequency pass band reduces the signal in amplitude to a level significantly lower than the voice signal, thereby allowing normal voice communications over the communication system.

Figure 3:
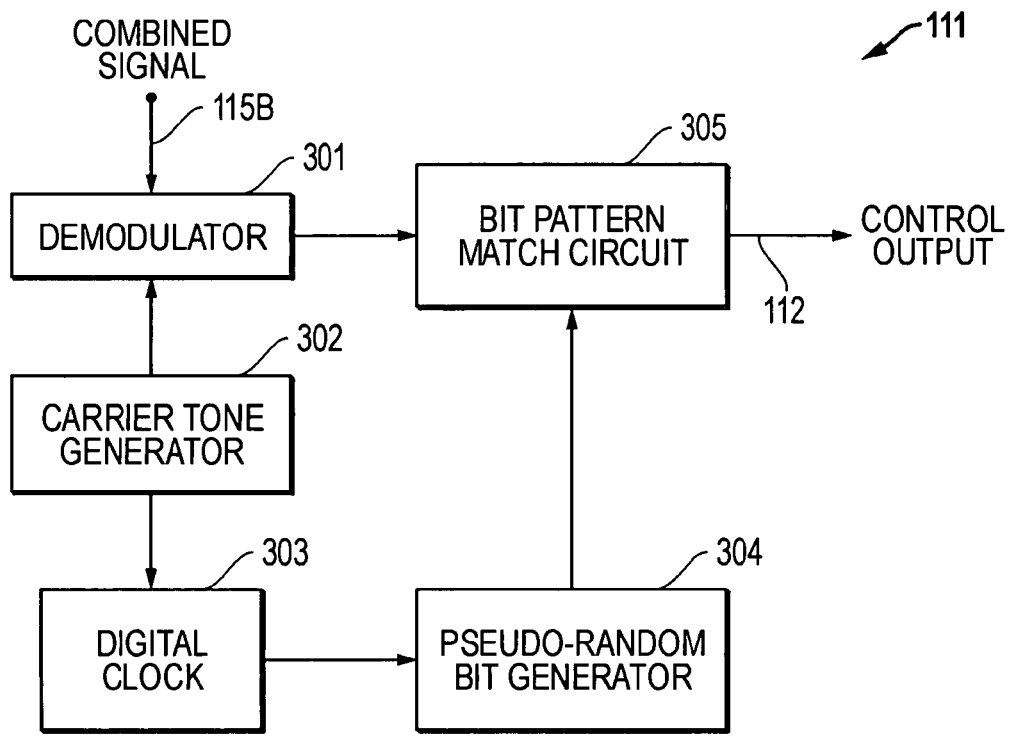
FIG. 3 is a block diagram of a control signal decoder within a receiving device.

FIG. 3 shows example components of the control signal decoder 111 associated with the receiving device 116B. The combined signal 115B includes the modulated control carrier signal 115A associated with the control signal 104, when the control signal has been sent. The demodulator 301 extracts pseudo-random control signals from the combined voice and control carrier signals to identify the state of the control signal 104. A carrier tone generator 302 creates a carrier signal having a frequency that matches the carrier frequency generated by carrier tone generator 201 in the transmitting device 116A. This matched carrier signal is output to the demodulator 301 and to the digital clock circuitry 303. The digital clock circuitry 303 outputs a digital clock signal based upon the carrier signal, and this digital clock signal is used to shift a bit sequence in the pseudo-random bit generator 304. The pseudo-random bit generator 304 recreates the pseudo-random sequence of binary bits used by the pseudo-random bit generator 203 in the transmitting device 116A. This pseudo-random code is sent to bit pattern match circuit 305. The bit pattern match circuit 305 identifies the code removed from the carrier using correlation techniques, allowing the control signal to be extracted from the combined signal 115B when other signals, such as voice signals, are present. A code match for the control signal is determined, and a match indicator signal is used as the control output signal 112 to indicate whether a code match has occurred.

In operation, the presence of a control carrier signal modulated with a particular code indicates that a match has occurred. This match is then used to control particular modes of operation of the receiving device. For example, PTT control signals can be communicated as in-band communication signals using this technique. Other control signals may be communicated as well, with each control signal being associated with a different code.

As described herein, therefore, pseudo-random codes can be used to modulate the control carrier signal. As such, control information intended for controlling communication devices can be included as part of communications that meet requirements for communicating information over an occupied voice-grade channel. These requirements can include requirements relating to secure communications. In traditional systems, security measures within the voice communication system often cause disruptions to control signals, such as out-of-band control signaling. The techniques described herein, therefore, provide significant advantages were security measures are utilized within the communication system. By spreading the control carrier signal within the voice frequency band for the voice signals being communicated, security measures can be used to protect the voice signal communications while not disrupting the in-band control signaling.

It is noted that FIG. 2 and FIG. 3 show example implementations for the techniques described herein. These examples utilize a single carrier and control code, which provides for controlling a single mode or function at the receiving end. However, it is understood that the technology could be used to allow multiple carriers and multiple control codes. The use of multiple carriers using orthogonal frequencies provides for further reduction of the amplitude of the carriers and further extension of the number of control functions that can be supported within the communication system. The use of multiple orthogonal control codes, therefore, would allow for multiple control functions.

It is further noted that the techniques described herein could be implemented using multiple-carriers for a given control signal. The purpose of this approach is to help assure the control energy is distributed over the voice frequency band. When a single control carrier signal is phase modulated with the spreading code, the resulting control signal spectrum often has a peak centered at the frequency of the control carrier signal. This peak can be avoided with the use of multiple orthogonal control carrier signals having reduced amplitudes. All of the multiple control carrier signals are then modulated with part of the code. This multiple-carrier-signals approach helps to assure the control energy is more evenly distributed over the full voice frequency band while maintaining the total energy necessary for extracting the coded information from the combined signal.

Figure 4A:
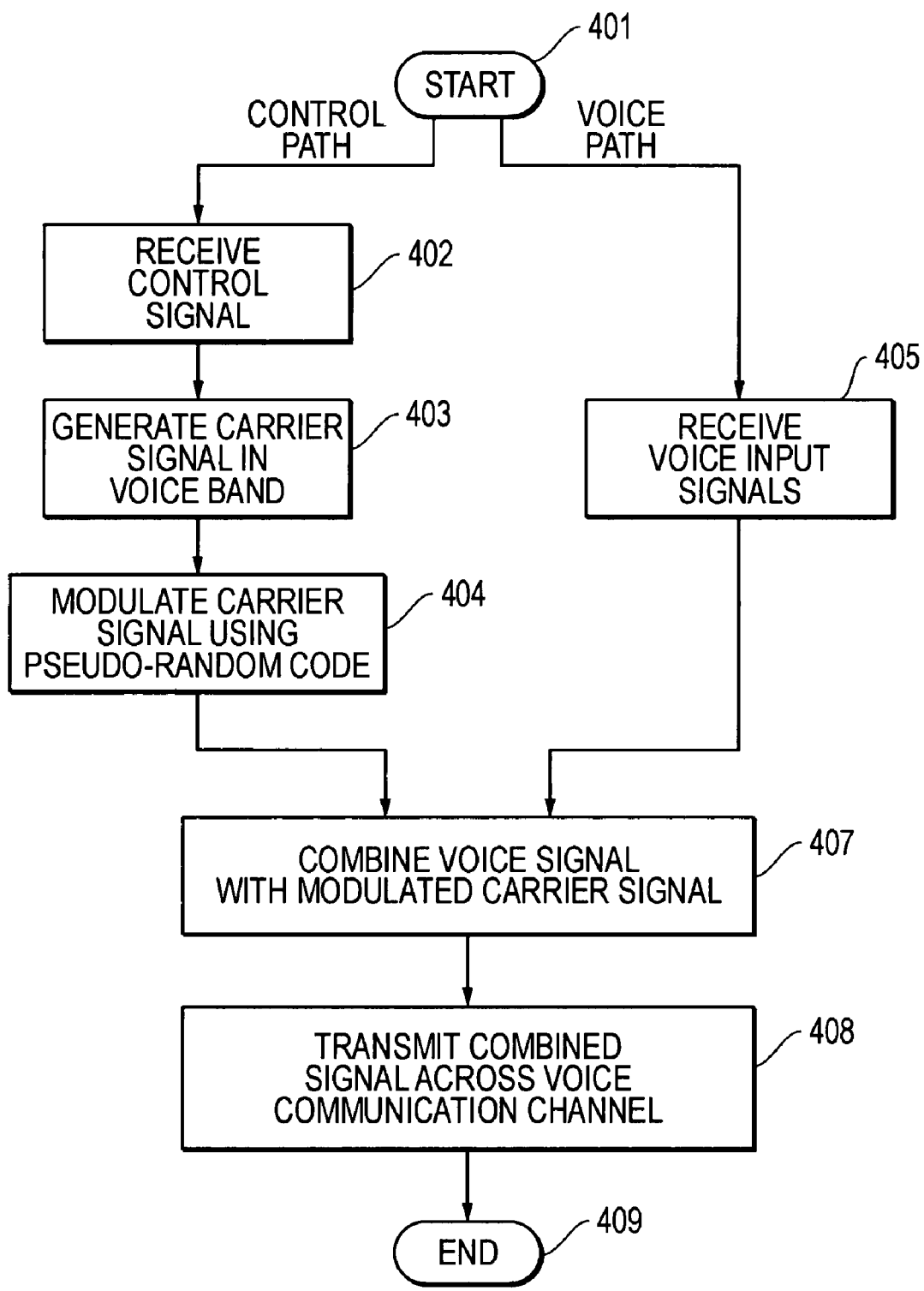
FIG. 4A is a flowchart of the steps for transmitting control signals over a voice communication channel.

FIG. 4A is a flowchart showing the method 400 for transmitting in-band control signals using bandwidth distributed encoding. As described above, encoded control information is sent over the voice communication channel along with the voice signals. The control information is spread across the entire voice band so that it does not interfere with normal voice communications. Referring to FIG. 4A, the process begins in step 401. A control path next flows to step 402 where a control signal is received. In step 403, a control carrier signal is generated in the voice band. In step 404, the control carrier signal is modulated using pseudo-random codes to spread the control carrier signal across the voice band. This control path then flows into step 407. A voice path flows from start step 401 to step 405 where voice signals are received. In step 407, the analog voice signals are combined with the modulated control carrier signal to form a combined signal. In step 408, the combined signal is transmitted across the voice communication channel. The method 400 ends in step 408. However, it is noted that the method 400 can be repeated over time. It is further noted that the control path can be implemented such that a modulated control carrier signal is only generated and combined with the voice signal when a control signal is needed to be communicated.

Figure 4B:
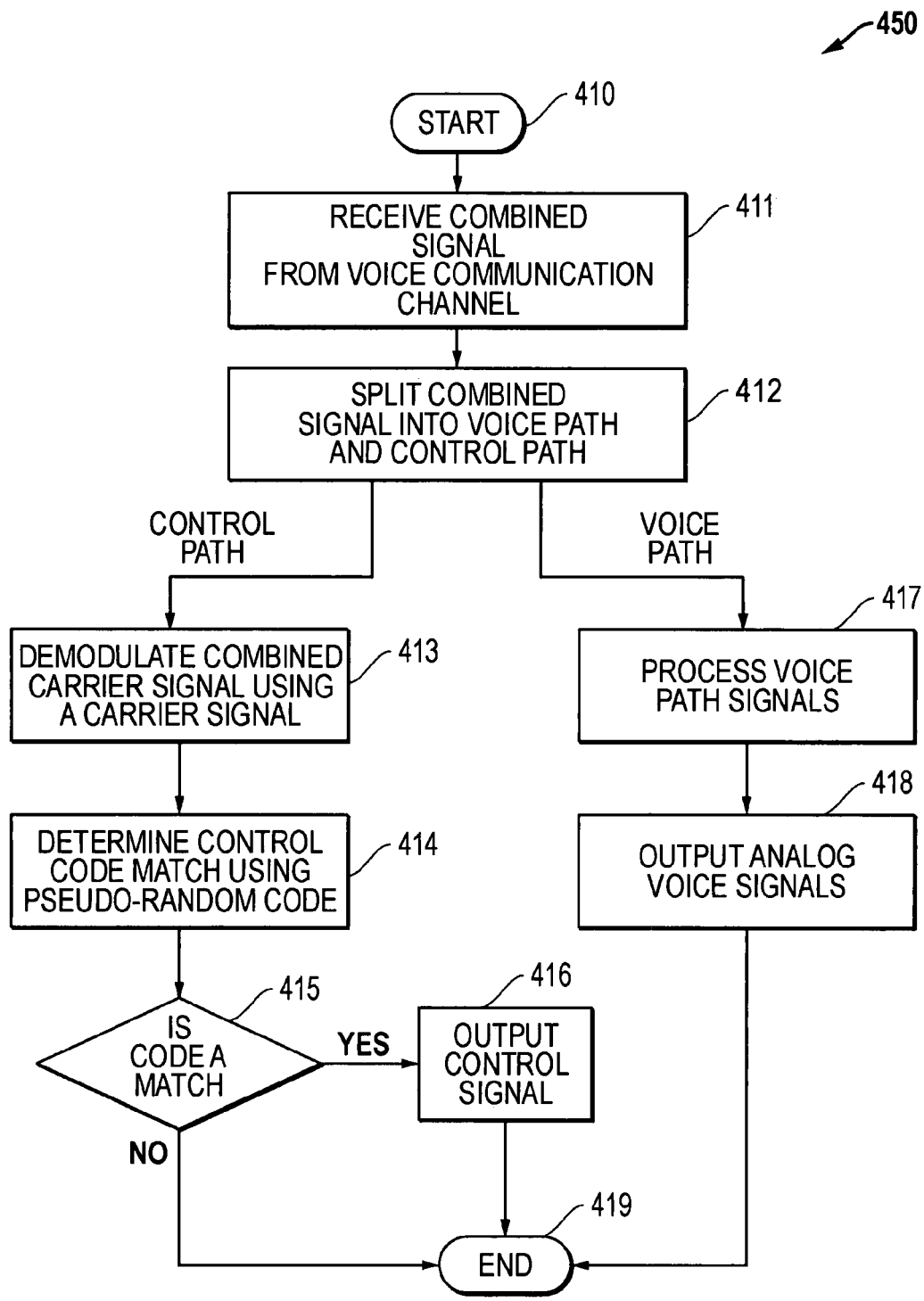
FIG. 4B is a flowchart of the steps for receiving voice and control signals transmitted over a voice communication channel.

FIG. 4B is a flowchart showing the method 450 of a receiving portion of in-band control signaling using bandwidth distributed encoding. As described above, the presence of the correct code in the combined signal is used to control equipment at a receive end of the communication system. However, it is understood that the application does not limit the use of the techniques described herein to the control of equipment. The techniques described herein may be used for other signaling applications, as well, such as signaling operators at a receiver end that certain events are occurring.

Referring back to FIG. 4B, the process begins in step 410. In step 411, the combined signal is received from the voice communication channel 107. In step 412, the combined signal is split into a voice path and a control path. The voice path proceeds to step 417 where the combined signal is processed to recover voice signals. Analog voice signals are then output in step 418. The voice path then ends at step 419. The control path proceeds to step 413 where the combined signal is demodulated using a carrier signal that matches the carrier signal used in step 403. In step 414, pseudo-random codes are used to determine if there is a code match with respect to the demodulated signals. The pseudo-random codes used in step 414 match the pseudo-random codes used to modulate the control carrier signal in step 404. A determination is then made in decision block 415 whether a code match has occurred. If "no," then the control path ends at step 419. If "yes," then step 416 is reached where the matched control signal is output. The control path then ends at step 419.

It is noted that multiple codes could be sent using the techniques described above. If so, then process 450 could include multiple control paths where the different control signal codes are checked for a match, or multiple different codes could be checked in step 414. The codes that match indicate that the control signal has been sent, and appropriate actions can be taken in the receive device according to these received control signals.

It is further noted that a communication system would likely include two-way communications. At one location, there would be a device including transmitting circuitry and receiving circuitry as described above. At another location, there would also be a device including transmitting circuitry and receiving circuitry. The two-way communications could be implemented such that only one device is transmitting while the other device is receiving. Alternatively, the devices could be communicating in duplex mode such that they are transmitting and receiving at the same time.

Figure 5:
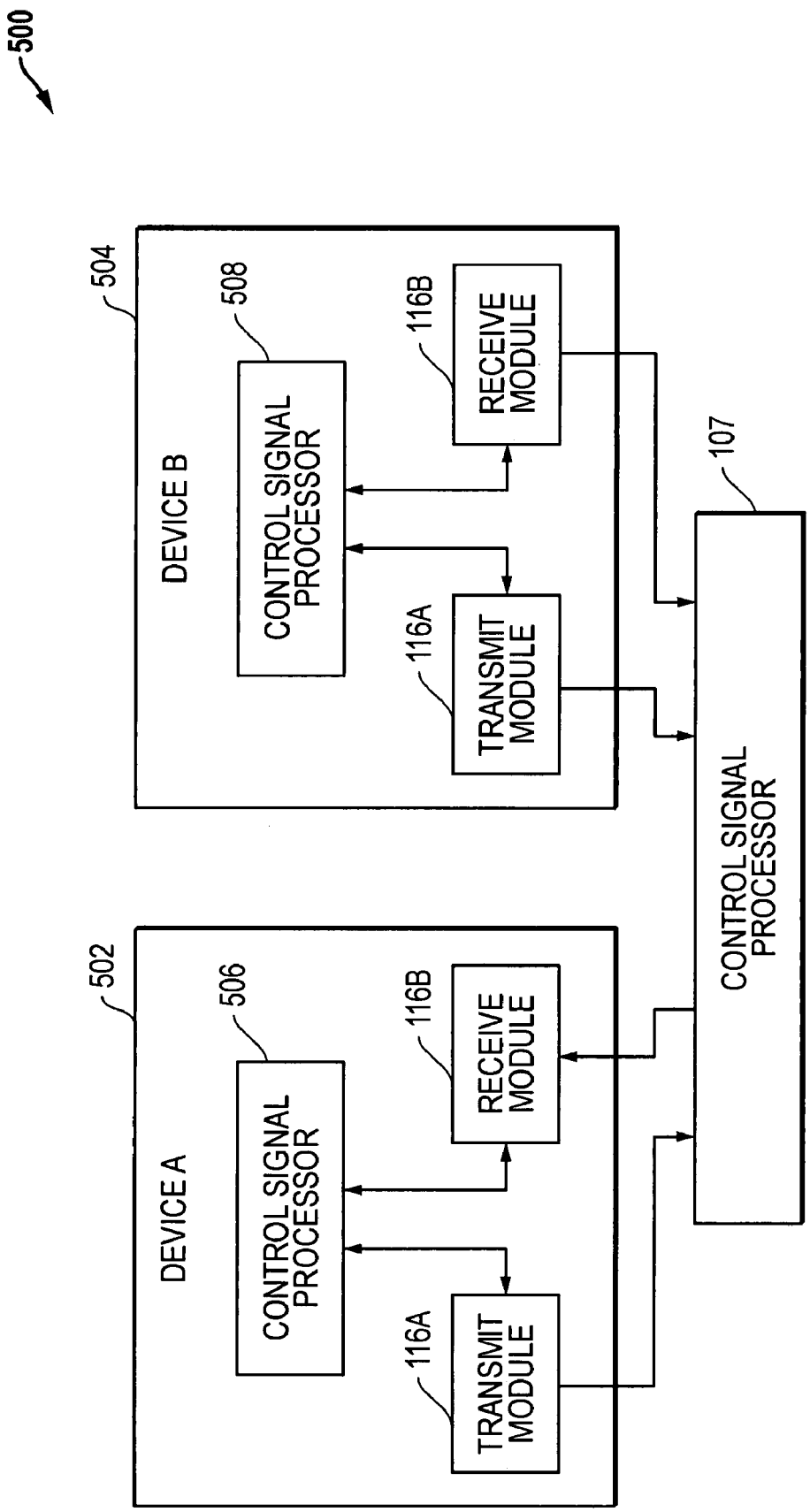
FIG. 5 is a block diagram for a system having devices communication through two-way communications.

FIG. 5 is a block diagram for an example embodiment 500 for two devices communicating with two-way voice communications. A first device (DEVICE A) 502 includes a transmit module 116A and a receive module 116B that communicate through the voice communication channel 107 with a second device (DEVICE B) 504. The second device (DEVICE B) 504 also includes a transmit module 116A and a receive module 116B that communicate through the voice communication channel 107. The transmit modules 116A can be implemented, for example, as described with respect to FIG. 2 above. And the receive modules 116B can be implemented, for example, as described with respect to FIG. 3 above.

In addition, the first device (DEVICE A) 502 includes a control signal processor 506 that communicates with the transmit module 116A and the receive module 116B. Similarly, the second device (DEVICE B) 504 includes a control signal processor 508 that communicates with the transmit module 116A and receive module 116B. It is noted that the control signals sent and received by the devices are not required to be the same. These control signals may be configured and implemented, as desired, depending upon the operational features desired. The push-to-talk (PTT) control signal discussed above is simply an example of one control signal that can be sent as a modulated in-band carrier signal spread across the entire voice frequency band for the communication system.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described. It is to be understood that the forms of the techniques described herein shown and described are to be taken as the presently preferred embodiments. Various changes may be made in the implementations and architectures. For example, equivalent elements may be substituted for those illustrated and described herein, and certain features of the techniques described may be utilized independently of the use of other features, all as would be apparent to one skilled in the art after having the benefit of this description of the techniques described herein.

What is claimed is:

1. A voice communication system using in-band control signaling, comprising:

a transmitting device;

a voice input processor associated with the transmitted device and configured to output at least one analog voice signal based upon voice input, the analog voice signal being within a voice frequency band;

a control signal encoder associated with the transmitting device and configured to generate at least one control carrier signal associated with at least one control signal, the control signal encoder further configured to utilize a pseudo-random code to modulate the control carrier signal to spread the control carrier signal over the voice frequency band;

a combiner associated with the transmitting device and the control signal encoder, the combiner being configured to receive and combine the analog voice signal and the modulated control carrier signal to form a combined signal;

first channel communication circuitry associated with the transmitting device and configured to transmit the combined signal through a communication channel;

a receiving device configured to receive signals from the communication channel;

second channel communication circuitry associated with the receiving device and configured to receive the combined signal from the communication channel;

a splitter associated with the receiving device, the splitter being configured to receive the combined signal from the second channel communication circuitry and configured to split the combined signal into a voice path and a control path;

a voice output processor for the voice path associated with the receiving device and configured to generate voice output signals from the combined signal, the voice output signals correlating to the voice input signals; and a control signal decoder for the control path associated with the receiving device and configured to demodulate the combined signal, the control signal decoder being further configured to use a pseudo-random code to determine if the modulated control carrier signal exists within the combined signal, the pseudo-random code correlating to the pseudo-random code used by the control signal decoder.

2. The voice communication system of claim 1, wherein the control signal comprises a push-to-talk control signal.

3. The voice communication system of claim 1, further comprising a match output indicator associated with the receiving device and configured to provide an indication that a control signal match has occurred.

4. The voice communication system of claim 3, wherein the receiving device is further configured to respond to the control signal if a control signal match occurs.

5. The voice communication system of claim 1, wherein the voice input processor comprises a transmitting voice processor with a microphone configured to receive the voice input signals.

6. The voice communication system of claim 1, wherein the voice output processor comprises a receiving voice processor and a speaker for outputting voice signals.

7. The voice communication system of claim 1, wherein the voice communication channel comprises one of a plurality of channels within a frequency band for a communication system.

8. The voice communication system of claim 1, wherein one or more security measures are utilized to protect voice communications.

9. The voice communication system of claim 1, wherein the transmitting device is also configured to be a receiving device, and wherein the receiving device is also configured to be a transmitting device to provide two-way communications through the voice communication channel.

10. A transmitting device for voice communications using in-band control signaling, comprising:
    a voice input processor configured to generate at least one analog voice signal based upon voice input signals, the analog voice signal being within a voice frequency band;
    a control signal encoder associated with the transmitting device and configured to generate at least one control carrier signal associated with at least one control signal, the control signal encoder further configured to modulate the control carrier signal with a pseudo-random code to spread the control carrier signal over the voice frequency band; and
    a combiner associated with the transmitting device and the control signal encoder, the combiner being configured to receive and combine the analog voice signal and the modulated control carrier signal to form a combined signal.

11. The transmitting device of claim 10, further comprising channel communication circuitry configured to transmit the combined signal through a voice communication channel.

12. The transmitting device of claim 10, wherein the control signal encoder comprises a carrier tone generator, a pseudo-random bit generator configured to create a pseudo-random bit sequence of binary bits, a digital clock configured to shift the bit sequence, and a modulator configured to receive input from the carrier tone generator and the bit generator and to output the modulated control carrier signal.

13. A receiving device for voice communications using in-band control signaling, comprising
    input circuitry configured to receive a combined signal within a voice frequency band, the combined signal including an analog voice signal within the voice frequency band and a modulated control carrier signal within the voice frequency band, if a control signal is being communicated to the receiving device;
    a voice output processor configured to generate voice output signals from the analog voice signal within the combined signal; and
    a control signal decoder configured to process the combined signal using a pseudo-random code to determine if the modulated control carrier signal exists within the combined carrier signal, the pseudo-random code being associated with the control signal.

14. The receiving device of claim 13, further comprising channel communication circuitry configured to receive the combined signal through a voice communication channel.

15. The receiving device of claim 13, wherein the control signal encoder comprises carrier tone generator, a demodulator coupled to the carrier tone generator, a pseudo-random bit generator configured to generate a pseudo-random bit sequence of binary bits, a digital clock configured to shift the bit sequence in the pseudo-random bit generator, and a bit pattern match circuit coupled to the demodulator and the pseudo-random bit generator.

16. A method for transmitting voice communications using in-band control signaling, comprising:
    receiving voice information;
    outputting an analog voice signal within a voice frequency band, the analog voice signal containing the voice information;
    receiving a control signal;
    generating a control carrier signal within the voice frequency band;
    spreading the control carrier signal over the frequency band to generate a modulated control carrier signal;
    combining the analog voice signal and the modulated control carrier signal to form a combined carrier signal; and
    transmitting the combined signal across a communication channel.

17. The method of claim 16, wherein the receiving step comprises receiving a push-to-talk control signal.

18. The method of claim 16, wherein the spreading step comprises using a pseudo-random code to spread the control carrier signal over the voice frequency band, and wherein the pseudo-random code is associated with the control signal.

19. The method of claim 18, wherein the receiving, generating, spreading and combining steps are performed for a plurality of different control signals, each control signal being associated with a different pseudo-random code.

20. The method of claim 18, wherein the generating step comprises generating a plurality of control carrier signals associated with a single control signal and wherein the spreading step comprises using the pseudo-random code to spread each of the plurality of control carrier signals over the voice frequency band.

21. The method of claim 16, further comprising applying one or more security measures to the combined carrier signal prior to the transmitting step.

22. The method of claim 16, wherein the voice frequency band is from about 300 Hz to about 3000 Hz.

23. A method for receiving voice communications using in-band control signal, comprising:
    receiving a combined signal from a communication channel, the combined signal including an analog voice signal within a voice frequency band and a control carrier signal spread over the voice frequency band, if a control signal is being communicated to the receiving device;

generating voice output signals from the analog voice signal within the combined signal;

despreading the combined signal to determine if the control carrier signal exists within the combined signal; and outputting a control signal when a the modulated control carrier signal is determined to exist.

24. The method of claim 23, wherein the outputting step comprises outputting a push-to-talk control signal.

25. The method of claim 23, wherein the despreading step comprises using a pseudo-random code to despread the combined signal, the pseudo-random code being associated with the control signal and a code match being deemed to have occurred if the control carrier signal is determined to exist within the combined signal.

26. The method of claim 25, wherein the despreading and outputting steps are performed for a plurality of different control signals, each control signal being associated with a different pseudo-random code.

27. The method of claim 25, wherein the receiving step comprises receiving a combined signal including a plurality of control carrier signals for a single control signal spread over the voice frequency band and wherein the despreading step comprises using the pseudo-random code to despread the combined signal, the pseudo-random code being associated with the control signal and a code match being deemed to have occurred if the plurality of control carrier signals are determined to exist within the combined signal.

28. The method of claim 23, wherein the combined signal received from the communication channel includes one or more security measures.

29. The method of claim 23, wherein the voice frequency band is from about 300 Hz to about 3000 Hz.

* * * * *